United States Patent
Yuan

(10) Patent No.: US 12,292,748 B2
(45) Date of Patent: May 6, 2025

(54) LAWN MOWER CONTROL METHOD AND DEVICE, LAWN MOWER, AND STORAGE MEDIUM

(71) Applicant: SHENZHEN MAMMOTION INNOVATION CO., LIMITED, Guangdong (CN)

(72) Inventor: Li Yuan, Guangdong (CN)

(73) Assignee: SHENZHEN MAMMOTION INNOVATION CO., LIMITED, Guangdong (CN)

( * ) Notice: Subject to any disclaimer, the term of this patent is extended or adjusted under 35 U.S.C. 154(b) by 0 days.

(21) Appl. No.: 18/840,332

(22) PCT Filed: Apr. 17, 2023

(86) PCT No.: PCT/CN2023/088684
§ 371 (c)(1),
(2) Date: Aug. 21, 2024

(87) PCT Pub. No.: WO2023/202529
PCT Pub. Date: Oct. 26, 2023

(65) Prior Publication Data
US 2025/0110512 A1    Apr. 3, 2025

(30) Foreign Application Priority Data

Apr. 20, 2022  (CN) .......................... 202210414693.3

(51) Int. Cl.
*G05D 1/86* (2024.01)
*A01D 34/00* (2006.01)
(Continued)

(52) U.S. Cl.
CPC ............. *G05D 1/86* (2024.01); *A01D 34/006* (2013.01); *G05D 1/87* (2024.01); *G05D 2107/23* (2024.01)

(58) Field of Classification Search
CPC ........ G05D 1/86; G05D 1/87; G05D 2107/23; A01D 34/006
See application file for complete search history.

(56) References Cited

U.S. PATENT DOCUMENTS 11,481,918 B1 * 10/2022 Ebrahimi Afrouzi ........................ A47L 11/4008
12,007,728 B1 *  6/2024 Mohta ..................... G06N 3/045
(Continued)

FOREIGN PATENT DOCUMENTS

CN    101464219 A    6/2009
CN    101039021 A    9/2009
(Continued)

OTHER PUBLICATIONS

International Search Report, International Application No. PCT/CN2023/088684, mailed Jul. 24, 2023.
(Continued)

*Primary Examiner* — Michael J Zanelli
(74) *Attorney, Agent, or Firm* — Ladas & Parry, LLP

(57) ABSTRACT

A lawn mower control method and device, a lawn mower, and a storage medium. The method comprises: detecting operating data and sensing data of a plurality of operating sensors provided on a lawn mower, wherein the plurality of operating sensors comprise at least two different types of sensors; fusing the sensing data of the plurality of operating sensors to obtain environment data around the lawn mower; determining, when it is detected that a fault occurs in any of the operating sensors, a fault type of a faulty sensor according to the operating data of the faulty sensor and the environment data around the lawn mower; and controlling, if the fault type of the faulty sensor is a first fault type, the faulty sensor to stop operating, and a backup sensor corresponding to the faulty sensor to start operating.

20 Claims, 2 Drawing Sheets

(51) Int. Cl.
*G05D 1/87* (2024.01)
*G05D 107/20* (2024.01)

(56) References Cited

U.S. PATENT DOCUMENTS

| | | | |
|---|---|---|---|
| 2018/0101168 A1 | 4/2018 | Lv et al. | |
| 2019/0357431 A1 | 11/2019 | Kamfors et al. | |
| 2021/0382476 A1* | 12/2021 | Morrison | G06Q 10/047 |
| 2023/0258797 A1* | 8/2023 | Jang | G01S 17/42 |
| | | | 342/70 |

FOREIGN PATENT DOCUMENTS

| | | | |
|---|---|---|---|
| CN | 103106126 | A | 5/2013 |
| CN | 103576567 | A | 2/2014 |
| CN | 103676861 | A | 3/2014 |
| CN | 103676946 | A | 3/2014 |
| CN | 204613789 | U | 9/2015 |
| CN | 105612909 | A | 6/2016 |
| CN | 105955148 | A | 9/2016 |
| CN | 106354141 | A | 1/2017 |
| CN | 107703922 | A | 2/2018 |
| CN | 111178378 | A | 5/2020 |
| CN | 111188650 | A | 5/2020 |
| CN | 112595919 | A | 4/2021 |
| CN | 114812652 | A | 7/2022 |
| KR | 102151814 | B1 * | 9/2020 |
| WO | 2011032307 | A1 | 3/2011 |

OTHER PUBLICATIONS

Written Opinion of the International Searching Authority in International Application No. PCT/CN2023/088684, mailed Jul. 24, 2023 with English translation provided by WIPO.

First Office Action and search report in Chinese Application No. 202210414693.3, issued on Jun. 20, 2023 with machine translation provided by global dossier.

Second Office Action in Chinese Application No. 202210414693.3, issued on Oct. 25, 2023, with English translation provided by Google Translate.

Notification of Grant Patent Right for Invention in Chinese patent Application No. 202210414693.3, issued on Mar. 1, 2024.

* cited by examiner

LAWN MOWER CONTROL METHOD AND DEVICE, LAWN MOWER, AND STORAGE MEDIUM

CROSS-REFERENCE TO RELATED APPLICATIONS

The present application is the national phase application of PCT application No. PCT/CN2023/088684 filed on Apr. 17, 2023, which claims the priority to Chinese Patent Application No. 202210414693.3, filed with the China National Intellectual Property Administration on Apr. 20, 2022 and entitled "LAWN MOWER CONTROL METHOD AND DEVICE, LAWN MOWER, AND STORAGE MEDIUM", the disclosures of which are incorporated herein by reference in their entireties.

TECHNICAL FIELD

The present application relates to the technical field of lawn mowers, and in particular to a lawn mower control method and device, a lawn mower and a storage medium.

BACKGROUND ART

With the development of urban construction, people's awareness of environmental protection has improved, the level of urban greening has become the standard of measuring the level of urban development and people's quality of life. In recent years, the number of green spaces urban squares and living areas has increased, and the maintenance of lawn has become increasingly onerous.

In conventional technology, the lawn is usually repaired manually or by using a self-propelled hand-push lawn mower. The manual repair method consumes a large amount of human and material resources, and workers thus have a heavy workload and long working time. Moreover, it is difficult to trim the lawn evenly, with poor trimming effect, and there are many weeds cut, which need to be collected and removed from the lawn. The use of self-propelled hand-push lawn mowers still need workers to operate, which is inefficient, and most lawn mowers use gasoline as power sources, which are noisy and pollute the environment.

Compared to traditional lawn mowers, automatic lawn mowers have the advantages of simple operation, high lawn mowing efficiency, environmental protection and energy saving, low noise, etc., can automatically complete lawn mowing tasks, reduce labor costs and time costs, and have become a major development direction of the lawn mower industry. Current automatic lawn mowers usually use ultrasonic sensors to sense the surrounding environment. However, sensing data of the ultrasonic sensor alone is not enough to provide an accurate sensing function so that some emergency situations cannot be solved, resulting in impairment of the normal operation of the lawn mower.

SUMMARY OF THE INVENTION

Embodiments of the present application provide a lawn mower control method and device, a lawn mower, and a storage medium, which can solve the problem of sensing data of an ultrasonic sensor alone being not enough to provide an accurate sensing function so that some emergency situations cannot be solved, resulting in impairment of the normal operation of the lawn mower.

In a first aspect, the embodiments of the present application provide a lawn mower control method, comprising:

detecting operating data and sensing data of a plurality of operating sensors provided on a lawn mower, wherein the plurality of operating sensors comprise at least two different types of sensors;

fusing the sensing data of the plurality of operating sensors to obtain environment data around the lawn mower;

determining, when it is detected that a fault occurs in any of the operating sensors, a fault type of a faulty sensor according to the operating data of the faulty sensor and the environment data around the lawn mower, wherein the faulty sensor is an operating sensor in which a fault occurs; and controlling, if the fault type of the faulty sensor is a first fault type, the faulty sensor to stop operating, and a backup sensor corresponding to the faulty sensor to start operating.

In some possible implementations, the step of determining the fault type of the faulty sensor according to the operating data of the faulty sensor and the environment data around the lawn mower comprises:

determining the fault type of the faulty sensor according to the operating data of the faulty sensor, the environment data around the lawn mower, and a correspondence table corresponding to the faulty sensor, wherein the correspondence table comprises a correspondence of various fault types with a range of parameters, the range of parameters comprising a range of operating data and a range of environment data.

In some possible implementations, the correspondence table is a preset correspondence table; or the correspondence table is a correspondence table obtained from a server based on historical fault data.

In some possible implementations, the step of determining the fault type of the faulty sensor according to the operating data of the faulty sensor, the environment data around the lawn mower, and a correspondence table corresponding to the faulty sensor comprises:

determining, if the operating data of the faulty sensor and the environment data around the lawn mower satisfy a range of parameters corresponding to the first fault type characterizing a hardware fault, that the fault type of the faulty sensor is the first fault type; and determining, if the operating data of the faulty sensor and the environment data around the lawn mower satisfy a range of parameters corresponding to a second fault type characterizing a software fault, that the fault type of the faulty sensor is the second fault type.

In some possible implementations, the step of determining the fault type of the faulty sensor according to the operating data of the faulty sensor and the environment data around the lawn mower comprises:

using a trained fault recognition model to perform fault recognition based on the operating data of the faulty sensor and the environment data around the lawn mower, so as to obtain the fault type of the faulty sensor; wherein a training method for the trained first fault recognition model comprises:

obtaining training data, the training data comprising operating data and environment data when a fault occurs in a sample faulty sensor, and a true fault type of the sample faulty sensor, wherein the true fault type comprises the first fault type characterizing a hardware fault and a second fault type characterizing a software fault; and using the training data to train a fault recognition model to be trained, so as to obtain a trained fault recognition model.

In some possible implementations, before controlling a backup sensor corresponding to the faulty sensor to start operating, the method further comprises:

determining the backup sensor corresponding to the faulty sensor.

In some possible implementations, the step of determining the backup sensor corresponding to the faulty sensor comprises:

determining an identification of the faulty sensor;
determining an identification associated with the identification of the faulty sensor according to the identification of the faulty sensor and a preset association relationship, wherein the preset association relationship comprises an association relationship between an identification of each operating sensor and an identification of a respective backup sensor; and determining the backup sensor indicated by the identification associated with the identification of the faulty sensor as the backup sensor corresponding to the faulty sensor.

In some possible implementations, the method further comprises:

controlling the faulty sensor to restart if the fault type of the faulty sensor is the second fault type.

In some possible implementations, after controlling the faulty sensor to restart, the method further comprises:

controlling, if it is detected that a fault still occurs in the faulty sensor after restarting, the faulty sensor to stop operating, and the backup sensor corresponding to the faulty sensor to start operating.

In a second aspect, the embodiments of the present application provide a lawn mower control device, comprising:

a detection unit configured to detect operating data and sensing data of a plurality of operating sensors provided on a lawn mower, wherein the plurality of operating sensors comprise at least two different types of sensors;
a fusion unit configured to fuse the sensing data of the plurality of operating sensors to obtain environment data around the lawn mower;
a determination unit configured to determine, when it is detected that a fault occurs in any of the operating sensors, a fault type of a faulty sensor according to the operating data of the faulty sensor and the environment data around the lawn mower, wherein the faulty sensor is an operating sensor in which a fault occurs; and
a control unit configured to control, if the fault type of the faulty sensor is a first fault type, the faulty sensor to stop operating, and a backup sensor corresponding to the faulty sensor to start operating.

In a third aspect, the embodiments of the present application provide a lawn mower, comprising a memory storing a computer program, and a processor which, when executing the computer program, implements the method described in the first aspect above.

In a fourth aspect, the embodiments of the present application provide a computer-readable storage medium having stored thereon a computer program which, when executed by a processor, implements the method described in the first aspect above.

In a fifth aspect, the embodiments of the present application provide a computer program product comprising a computer program which, when executed by a processor, implements the method described in the first aspect above.

In the embodiments of the present application, operating data and sensing data of a plurality of operating sensors provided on a lawn mower are detected, wherein the plurality of operating sensors comprises at least two different types of sensors; the sensing data of the plurality of operating sensors is fused to obtain environment data around the lawn mower; when it is detected that a fault occurs in any of the operating sensors, a fault type of a faulty sensor is determined according to the operating data of the faulty sensor and the environment data around the lawn mower, wherein the faulty sensor is an operating sensor in which a fault occurs; and if the fault type of the faulty sensor is a first fault type, the faulty sensor is controlled to stop operating, and a backup sensor corresponding to the faulty sensor is controlled to start operating. Hereby, a plurality of different types of sensors operate simultaneously while the lawn mower is operating, and the fusion of the sensing data of the plurality of operating sensors can provide a redundant and accurate sensing function, so that a fault occurring in some of the operating sensors will not cause the sensing function of the lawn mower to fail. In addition, in combination with the operating data of the faulty sensor and the environment data around the lawn mower that is obtained by fusing the sensing data of the plurality of operating sensors, it is possible to more accurately recognize the fault type of the faulty sensor, and then switch the faulty sensor and the corresponding backup sensor according to the fault type, in order to effectively handle the fault, facilitating the normal operation of the lawn mower.

BRIEF DESCRIPTION OF THE DRAWINGS

In order to more clearly describe the technical solutions in the embodiments of the present application or the prior art, the drawings necessary for describing the embodiments or the prior art will be briefly described below. Apparently, the drawings in the description below merely show some of the embodiments of the present application, and those of ordinary skill in the art would have obtained other drawings from these drawings without involving any inventive effort.

DETAILED DESCRIPTION OF EMBODIMENTS

Figure 1:
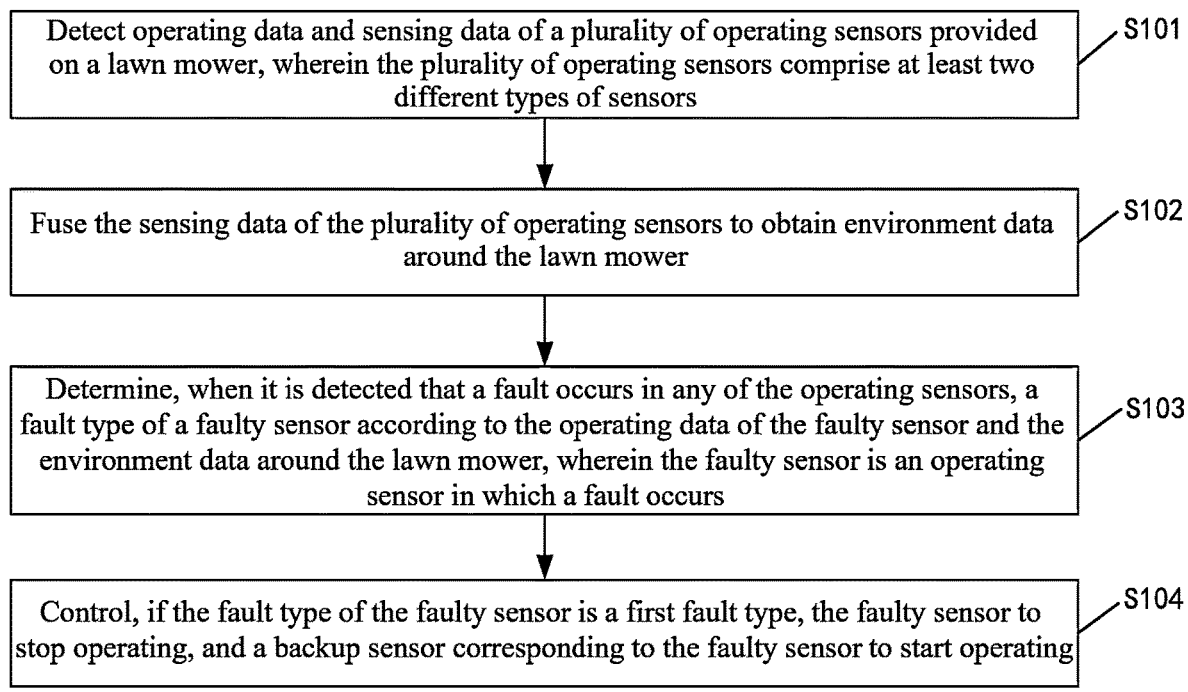
FIG. 1 is a schematic flow diagram of a lawn mower control method provided in an embodiment of the present application.

The technical solutions in the embodiments of the present application will be clearly and completely described below in conjunction with the accompanying drawings in the embodiments of the present application. Apparently, the embodiments described are some rather than all of the embodiments of the present application. All other embodiments obtained by those of ordinary skill in the art based on the embodiments of the present application without creative efforts shall fall within the scope of protection of the present application.

The terms "first", "second", "third", "fourth", etc. in the description, the claims, and the drawings of the present application are used to distinguish between different objects, rather than to describe a specific order. In addition, the terms "comprise" and "have" and any variations thereof are intended to cover a non-exclusive inclusion. For example, the process, method, system, product or device, which comprises a series of steps or units, is not limited to the listed steps or units, but optionally further comprises unlisted steps or units, or optionally further comprises other steps or units inherent to the process, method, product or device.

The term "and/or" herein is merely a description of the associated relationship of associated objects, and indicates that three relationships may exist. For example, A and/or B may indicate that only A exists, both A and B exist, and only B exists. The phrase "at least one" means one or more, and "a plurality of" means two or more.

The phrase "embodiment" mentioned herein means that the specific features, results, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

The lawn mower control method provided in the embodiments of the present application can be applied to a lawn mower, which may specifically be an automatic lawn mower, such as an intelligent lawn mowing robot. The lawn mower comprises a controller, which is communicatively connected to each of a plurality of operating sensors provided on the lawn mower in different locations. The controller may obtain the sensing data of the operating sensors and fuse the sensing data of the plurality of operating sensors to provide a redundant and accurate sensing function for the lawn mower, so as to control the lawn mower to perform an automatic lawn mowing operation more safely and effectively. The controller may also control a start-stop state of each operating sensor, for example by switching on a power supply to the operating sensor to start the operating sensor and by switching off the power supply to the operating sensor to stop the operating sensor.

Optionally, one or more operating sensors are provided on the lawn mower in each location, so that all the operating sensors can achieve a 360° sensing range, facilitating a full fusion of sensing information, further improving the precision and accuracy of the sensing capacity of the lawn mower, thereby maximizing the safety of the lawn mower during operation.

The sensor types of a plurality of operating sensors in the same location may be the same or different, and the sensor types of the operating sensors in different locations may be the same or different. The sensor types may include, but are not limited to, image sensors and position sensors. By way of example, the image sensor may be, but is not limited to, a Time of Flight (TOF) camera, a Red-Green-Blue (RGB) camera, a vision sensor, a millimeter wave radar sensor or a lidar sensor; and the position sensor may be, but is not limited to, an ultrasonic sensor or a Time of Flight (TOF) single-line lidar sensor.

Further, one or more backup sensors may be further provided on the lawn mower, and the controller is communicatively connected to each of the backup sensors. The controller may control a start-stop state of each backup sensor, for example by switching on a power supply to the backup sensor to start the backup sensor and by switching off the power supply to the backup sensor to stop the backup sensor. The function of the backup sensor is configured to adapt to the operating sensor on the lawn mower in any location.

Optionally, a backup sensor is provided on the lawn mower in each location, and when an operating sensor in which a fault occurs cannot operate normally, a backup sensor in the same location as the operating sensor in which the fault occurs can be used, to operate in place of the operating sensor in which the fault occurs, so as to implement the function to be implemented by the operating sensor in which the fault occurs.

Optionally, a location-moveable backup sensor is provided on the lawn mower, and when an operating sensor in which a fault occurs cannot operate normally, the movable backup sensor may be moved to the location of the operating sensor in which the fault occurs, to operate in place of the operating sensor in which the fault occurs, so as to implement the function to be implemented by the operating sensor in which the fault occurs.

Further, one or more auxiliary sensors may be further provided on the lawn mower, and the controller is communicatively connected to each auxiliary sensor, and may obtain the sensing data of each auxiliary sensor to assist in determining the environment condition around the lawn mower. For example, the auxiliary sensor may be, but is not limited to, an impact sensor, a humidity sensor, or a temperature sensor.

Referring to FIG. 1, FIG. 1 is a schematic flow diagram of a lawn mower control method provided in an embodiment of the present application. Taking the method applied to the above controller as an example for description, the method comprises the following steps S101 to S104.

In S101, operating data and sensing data of a plurality of operating sensors provided on a lawn mower are detected. The plurality of operating sensors comprises at least two different types of sensors.

The operating sensors refer to sensors in an operating state. During operation of the lawn mower, a plurality of different types of sensors operate simultaneously. The operating data may be understood as data characterizing the internal performance of sensors, such as voltage, current, sensing accuracy, etc. The sensing data may be understood as external data collected by sensors, such as image data, point cloud data, obstacle data, etc. around the lawn mower. During operation of the lawn mower, the controller may detect the operating data and the sensing data of each operating sensor in real time.

Optionally, the plurality of operating sensors comprises the following types of sensors: vision sensors, millimeter wave radar sensors, lidar sensors and ultrasonic sensors.

In S102, the sensing data of the plurality of operating sensors is fused to obtain environment data around the lawn mower.

The environment data is used to reflect the environment condition around the lawn mower, such as obstacles, humidity, temperature, etc. The environment data comprises obstacle avoidance data for controlling the lawn mower to navigate around obstacles. The obstacle avoidance data may comprise distance data between the lawn mower and the obstacles, and/or image data of the obstacles. When the lawn mower encounters an obstacle, the distance from the obstacle can be controlled based on the obstacle avoidance data, thereby navigating around the obstacle to continue mowing.

In an implementation, since the sensors applicable to sensing the positions of obstacles in different types or different environments are different, the sensing data of the plurality of operating sensors can be fused in any possible fusion way to obtain the environment data around the lawn mower, complementarity between different types of sensors improves the accuracy of sensing of the environment, especially the position of obstacles.

For example, a vision sensor may obtain an image of the surrounding environment, and a lidar sensor may obtain three-dimensional point cloud data. By fusing the sensing data of the vision sensor and the lidar sensor, the three-dimensional point cloud data can be projected onto the image, to add depth information to pixels on the image, facilitating a richer amount of information about the surrounding environment. A millimeter wave radar sensor may detect the distance, speed and location of an obstacle, a lidar sensor may detect the distance and location of the obstacle, and estimate the speed of the obstacle based on the position, and an ultrasonic sensor may detect the distance and location of the obstacle. The fusion of the sensing data of the millimeter wave radar sensor, the lidar sensor and the ultrasonic sensor helps to obtain more accurate information about the obstacle.

Taking three sensors A, B, C as an example, A is a vision sensor, B is an ultrasonic sensor, C is a radar sensor. In a possible scenario, if the obstacle is a transparent object (e.g., transparent glass, acrylic material, transparent epoxy, etc.), the sensor A cannot accurately detect the obstacle, information of the obstacle then can be obtained by the sensor B and the sensor C, and the position of the obstacle can be accurately sensed by combining the data of the three sensors A, B, C. On the contrary, there are scenarios that are suitable for vision sensors but not suitable for ultrasonic, radar and other sensors (including but not limited to scenarios where signal interference is large), and where the sensor B or the sensor C cannot accurately detect the information of the obstacle, the three sensors A, B and C can also together collect the information of the obstacle and perform accurate positioning through the fusion of the data of the three sensors.

In S103, when it is detected that a fault occurs in any of the operating sensors, a fault type of a faulty sensor is determined according to the operating data of the faulty sensor and the environment data around the lawn mower. The faulty sensor is the operating sensor in which a fault occurs.

When the controller detects that a fault occurs in any of the operating sensors in the operating state, the operating sensor in which a fault occurs is determined as a faulty sensor. Optionally, the controller detects the operating data and the sensing data of each operating sensor in real time and stores the operating data of each operating sensor, and the environment data around the lawn mower obtained by fusing the sensing data of the plurality of operating sensors. When it is detected that a fault occurs in any of the operating sensors, the operating data of the faulty sensor in the event of the fault and the environment data around the lawn mower are obtained from the stored data.

The operating data of the faulty sensor in the event of the fault can be used to determine whether the fault of the faulty sensor is caused by internal problems of the sensor (e.g., short circuit, component breakdown, or other circuit problems). The environment data around the lawn mower can be used to determine whether the fault of the faulty sensor is caused by environmental problems around the lawn mower (e.g., obstacles, water ingress, high temperature, etc.).

The controller the operating data of the faulty sensor in the event of the fault and the environment data around the lawn mower combines the operating data with the image data to determine the cause of the fault of the faulty sensor, so as to determine the fault type of the faulty sensor.

In S104, if the fault type of the faulty sensor is a first fault type, the faulty sensor is controlled to stop operating, and a backup sensor corresponding to the faulty sensor is controlled to start operating.

Different fault types correspond to different fault handling methods. After determining the fault type of the faulty sensor, the controller performs, according to a fault handling method corresponding to the determined fault type, fault handling by controlling the start-stop states of the faulty sensor and the corresponding backup sensor.

Where the fault type of the faulty sensor is the first fault type, it can be understood that the hardware of the faulty sensor is likely to be severely damaged. Where the fault type of the faulty sensor is the first fault type, the faulty sensor is controlled to stop operating, and the backup sensor corresponding to the faulty sensor is controlled to start operating, that is, the backup sensor corresponding to the faulty sensor is used in place of the faulty sensor to continue operating. Hereby, fault handling is achieved by performing redundant switching of the faulty sensor, facilitating the improvement of the lawn mower's ability to cope with emergency situations during operation and ensuring the safety of the lawn mower during operation.

With the above embodiment, a plurality of different types of sensors operate simultaneously while the lawn mower is operating, and the fusion of the sensing data of the plurality of operating sensors can provide a redundant and accurate sensing function, so that if a fault occurring in some of the operating sensors will not cause the sensing function of the lawn mower to fail. In addition, in combination with the operating data of the faulty sensor and the environment data around the lawn mower that is obtained by fusing the sensing data of the plurality of operating sensors, it is possible to more accurately recognize the fault type of the faulty sensor, and then switch the faulty sensor and the corresponding backup sensor according to the fault type, in order to effectively handle the fault, facilitating the normal operation of the lawn mower.

In a possible implementation, the step of determining the fault type of the faulty sensor according to the operating data of the faulty sensor and the environment data around the lawn mower may specifically comprise: determining the fault type of the faulty sensor according to the operating data of the faulty sensor, the environment data around the lawn mower, and a correspondence table corresponding to the faulty sensor, wherein the correspondence table comprises a correspondence of various fault types with a range of parameters, the range of parameters comprising a range of operating data and a range of environment data.

The correspondence tables corresponding to different types of sensors may be different. For example, there are correspondence tables corresponding to a vision sensor, a millimeter wave radar sensor, a lidar sensor and an ultrasonic sensor on a one-to-one basis. According to the type of the faulty sensor, the correspondence table corresponding to this type may be determined as the correspondence table corresponding to the faulty sensor.

The corresponding range of parameters corresponding to each fault type is included in the correspondence table, and different ranges of parameters correspond to different fault types, so that the operating data of the faulty sensor and the environment data around the lawn mower can be matched with the range of parameters in the correspondence table, to determine the fault type of the faulty sensor based on the fault type corresponding to the matched range of parameters.

For example, for a sensor A, the corresponding correspondence table is shown in Table 1 below.

TABLE 1

| Fault type | Range of operating data | Range of environment data |
|---|---|---|
| L1 | C1 | D1 |
| L2 | C2 | D2 |

That is, for the sensor A, the range of operating data and the range of environment data corresponding to the fault type L1 are C1 and D1, respectively; and the range of operating data and the range of environment data corresponding to the fault type L2 are C2 and D2, respectively.

In a possible implementation, the correspondence table is a preset correspondence table; or the correspondence table is a correspondence table obtained from a server based on historical fault data.

Optionally, a developer pre-creates a correspondence table for each type of sensor based on experience.

Optionally, the lawn mower uploads historical fault data to the server. The historical fault data comprises sensor types and fault type of historical faulty sensors, and operating data and environment data in the event of the fault. The server compiles statistics on the historical fault data to determine the correspondence table corresponding to each type of sensor, and sends the determined correspondence table corresponding to each type of sensor to the lawn mower.

In a possible implementation, the step of determining the fault type of the faulty sensor according to the operating data of the faulty sensor, the environment data around the lawn mower, and a correspondence table corresponding to the faulty sensor may specifically comprise: determining, if the operating data of the faulty sensor and the environment data around the lawn mower satisfy a range of parameters corresponding to the first fault type characterizing a hardware fault, that the fault type of the faulty sensor is the first fault type; and determining, if the operating data of the faulty sensor and the environment data around the lawn mower satisfy a range of parameters corresponding to a second fault type characterizing a software fault, that the fault type of the faulty sensor is the second fault type.

Optionally, by the operating data of the faulty sensor and the environment data around the lawn mower satisfying a range of parameters corresponding to the first fault type, it is meant that all the operating data falls within the range of operating data corresponding to the first fault type, and all the environment data falls within the range of environment data corresponding to the first fault type. By the operating data of the faulty sensor and the environment data around the lawn mower satisfying a range of parameters corresponding to a second fault type, it is meant that all the operating data falls within the range of operating data corresponding to the second fault type, and all the environment data falls within the range of environment data corresponding to the second fault type.

It should be noted that in other possible implementations, other fault types may be included in addition to the first fault type and the second fault type, or the first fault type and the second fault type may be further subdivided. This is not limited here.

By way of example, the first fault type is subdivided into a first hardware fault type and a second hardware fault type. The first hardware fault type may be understood as a hardware fault type caused by an external cause (e.g., impact by an object, water ingress, high temperature, etc.); and the second hardware fault type may be understood as a hardware fault type caused by an internal circuit abnormality (e.g., short circuit, component breakdown, etc.). Accordingly, the cause of the fault can be more accurately recognized by subdivision of the fault type, in order to handle the fault more effectively.

Optionally, image data within a preset period of time before the event of the fault is obtained from the sensing data of plurality of operating sensors, and the presence of an external cause is determined by image recognition. In addition, it is also possible to combine the image data with data detected by an impact sensor to assist in determining whether the lawn mower is subjected to an impact, with data detected by a humidity sensor to assist in verifying whether the lawn mower is subjected to water ingress, and with data detected by a temperature sensor to assist in verifying whether the lawn mower is in a high-temperature state.

In a possible implementation, the step of determining the fault type of the faulty sensor according to the operating data of the faulty sensor and the environment data around the lawn mower may specifically comprise: using a trained fault recognition model to perform fault recognition based on the operating data of the faulty sensor and the environment data around the lawn mower, so as to obtain the fault type of the faulty sensor. A training method for the trained first fault recognition model comprises: obtaining training data, the training data comprising operating data and environment data when a fault occurs in a sample faulty sensor, and a true fault type of the sample faulty sensor, wherein the true fault type comprises the first fault type characterizing a hardware fault and a second fault type characterizing a software fault; and using the training data to train a fault recognition model to be trained, so as to obtain a trained fault recognition model.

A sample faulty sensor is a sensor in which a fault has occurred and the fault type thereof is known. In the training data used to train the fault recognition model, the true fault type of the sample faulty sensor comprises the first fault type and the second fault type, so that the trained fault recognition model can be used to recognize the first fault type and the second fault type. Specifically, the operating data of the faulty sensor and the environment data around the lawn mower are input into the trained fault recognition model, and the fault recognition model outputs the fault type of the faulty sensor.

It should be noted that the true fault type of the sample faulty sensor is not limited to the first fault type and the second fault type. In other possible implementations, the true fault type of the sample faulty sensor may comprise other fault types in addition to the first fault type and the second fault type, or the first fault type and the second fault type may be further subdivided. This is not limited here. For example, the true fault type of the sample faulty sensor may comprise a first hardware fault type, a second hardware fault type, and a software fault type, such that the trained fault recognition model may be used to recognize the first hardware fault type, the second hardware fault type and the software fault type.

In a possible implementation, the method may further comprise: controlling the faulty sensor to restart if the fault type of the faulty sensor is the second fault type.

By the fault type of the faulty sensor being the second fault type, it is meant that the hardware of the faulty sensor may not be damaged, the fault occurring is a software fault with a low severity, and it is possible to solve the fault by restarting. Where the fault type of the faulty sensor is the second fault type, the faulty sensor is controlled to restart, without replacing the faulty sensor, thereby reducing unnecessary replacement, and saving the fault handling cost.

In a possible implementation, after controlling the faulty sensor to restart, the method further comprises: controlling, if it is detected that a fault still occurs in the faulty sensor after restarting, the faulty sensor to stop operating, and the backup sensor corresponding to the faulty sensor to start operating.

The operating state of the faulty sensor after restarting is still abnormal, meaning that the fault is not solved by restarting, so the faulty sensor is controlled to stop operating and a backup sensor is used to operate instead of the faulty sensor, to ensure that the fault can be handled effectively and that the lawn mower operates normally.

In a possible implementation, before controlling a backup sensor corresponding to the faulty sensor to start operating, the method may further comprise: determining the backup sensor corresponding to the faulty sensor. In a possible implementation, the step of determining the backup sensor corresponding to the faulty sensor may specifically comprises: determining an identification of the faulty sensor; determining an identification associated with the identification of the faulty sensor according to the identification of the faulty sensor and a preset association relationship, wherein the preset association relationship comprises an association relationship between an identification of each operating sensor and an identification of a respective backup sensor; and determining the backup sensor indicated by the identification associated with the identification of the faulty sensor as the backup sensor corresponding to the faulty sensor.

A unique corresponding identification may be set for each sensor in advance, and an association may be established between the identification of each operating sensor and the identification of the corresponding backup sensor to obtain a preset association relationship. Specifically, after monitoring the faulty sensor, the identification of the faulty sensor is determined, an identification associated with the identification of the faulty sensor is queried in the preset association relationship based on the identification of the faulty sensor, and a backup sensor indicated by the queried identification is determined as the backup sensor corresponding to the faulty sensor.

Optionally, the backup sensor uses a position sensor, such as an ultrasonic sensor. The cost of the position sensor is relatively low, and the use of the position sensor to operate instead of the faulty sensor can reduce the cost of fault handling while solving the fault.

Figure 2:
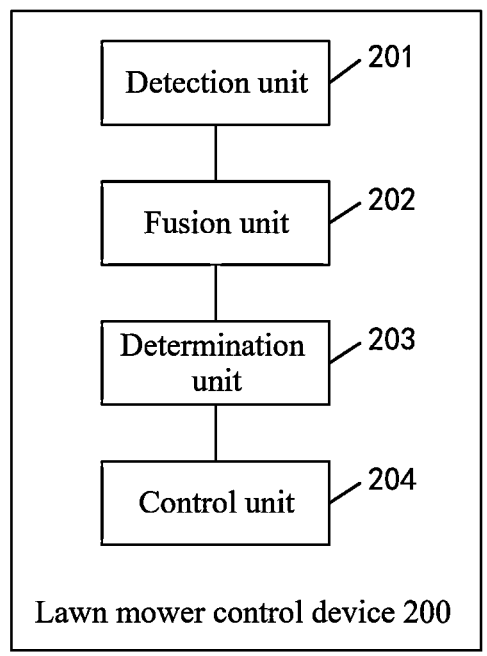
FIG. 2 is a schematic structural diagram of a lawn mower control device provided in an embodiment of the present application.

Referring to FIG. 2, FIG. 2 is a schematic structural diagram of a lawn mower control device provided in an embodiment of the present application. The lawn mower control device 200 comprises a detection unit 201, a fusion unit 202, a determination unit 203 and a control unit 204.

The detection unit 201 is configured to detecting operating data and sensing data of a plurality of operating sensors provided on a lawn mower. The plurality of operating sensors comprise at least two different types of sensors.

The fusion unit 202 is configured to fuse the sensing data of the plurality of operating sensors to obtain environment data around the lawn mower.

The determination unit 203 is configured to determine, when it is detected that a fault occurs in any of the operating sensors, a fault type of a faulty sensor according to the operating data of the faulty sensor and the environment data around the lawn mower. The faulty sensor is an operating sensor in which a fault occurs.

The control unit 204 is configured to control, if the fault type of the faulty sensor is a first fault type, the faulty sensor to stop operating, and a backup sensor corresponding to the faulty sensor to start operating.

In a possible implementation, when determining a fault type of a faulty sensor according to the operating data of the faulty sensor and the environment data around the lawn mower, the determination unit 203 may be specifically configured for determining the fault type of the faulty sensor according to the operating data of the faulty sensor, the environment data around the lawn mower, and a correspondence table corresponding to the faulty sensor, wherein the correspondence table comprises a correspondence of various fault types with a range of parameters, the range of parameters comprising a range of operating data and a range of environment data.

In a possible implementation, the correspondence table is a preset correspondence table; or the correspondence table is a correspondence table obtained from a server based on historical fault data.

In a possible implementation, when determining the fault type of the faulty sensor according to the operating data of the faulty sensor, the environment data around the lawn mower, and a correspondence table corresponding to the faulty sensor, the determination unit 203 may be specifically configured for determining, if the operating data of the faulty sensor and the environment data around the lawn mower satisfy a range of parameters corresponding to a first fault type characterizing a hardware fault, that the fault type of the faulty sensor is the first fault type; and determining, if the operating data of the faulty sensor and the environment data around the lawn mower satisfy a range of parameters corresponding to a second fault type characterizing a software fault, that the fault type of the faulty sensor is the second fault type.

In a possible implementation, when determining a fault type of a faulty sensor according to the operating data of the faulty sensor and the environment data around the lawn mower, the determination unit 203 may be specifically configured for using a trained fault recognition model to perform fault recognition based on the operating data of the faulty sensor and the environment data around the lawn mower, so as to obtain the fault type of the faulty sensor. A training method for the trained first fault recognition model comprises: obtaining training data, the training data comprising operating data and environment data when a fault occurs in a sample faulty sensor, and a true fault type of the sample faulty sensor, wherein the true fault type comprises a first fault type characterizing a hardware fault and a second fault type characterizing a software fault; and using the training data to train a fault recognition model to be trained, so as to obtain a trained fault recognition model.

In a possible implementation, before controlling a backup sensor corresponding to the faulty sensor, the control unit 204 is further configured for determining the backup sensor corresponding to the faulty sensor.

In a possible implementation, the control unit 204 is further configured for controlling the faulty sensor to restart if the fault type of the faulty sensor is the second fault type.

In a possible implementation, the control unit 204 is further configured for controlling, if it is detected that a fault still occurs in the faulty sensor after restarting, the faulty sensor to stop operating, and the backup sensor corresponding to the faulty sensor to start operating.

In a possible implementation, when determining the backup sensor corresponding to the faulty sensor, the control unit 204 is specifically configured for determining an identification of the faulty sensor; determining an identification associated with the identification of the faulty sensor according to the identification of the faulty sensor and a preset association relationship, wherein the preset association relationship comprises an association relationship between an identification of each operating sensor and an identification of a respective backup sensor; and determining the backup sensor indicated by the identification associated with the identification of the faulty sensor as the backup sensor corresponding to the faulty sensor.

Specific definitions of the lawn mower control device can be found in the aforementioned definitions of the lawn mower control method, and will not be described again here. All or some of the units of the lawn mower control device described above may be implemented by software, hardware and a combination thereof. Each of the units described above may be embedded in or independent of a processor of a computer device in the form of hardware, or may be stored in a memory of the computer device in the form of software, so that the processor can call and execute the operations corresponding to the units described above.

Figure 3:
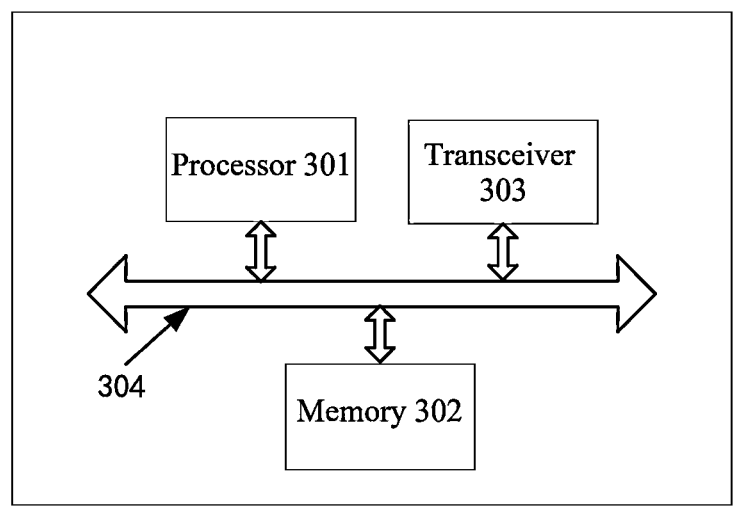
FIG. 3 is a schematic structural diagram of hardware of a lawn mower control device provided in an embodiment of the present application.

Referring to FIG. 3, FIG. 3 is a schematic structural diagram of hardware of a lawn mower control device provided in an embodiment of the present application. The hardware may comprise:

a processor 301, a memory 302 and a transceiver 303. The processor 301, the memory 302 and the transceiver 303 are connected via a bus 304. The memory 302 is configured to store instructions, and the processor 301 is configured to execute the instructions stored in the memory 302 to implement the steps in the above method.

The processor 301 is configured to execute instructions stored in the memory 302 to control the transceiver 303 to receive and transmit signals to perform the steps in the above method. The memory 302 may be integrated in the processor 301, or may be arranged separately from the processor 301.

As an implementation, it may be considered that the function of the transceiver 303 is implemented by a transceiver circuit or a dedicated transceiver chip. It may be considered that the processor 301 is implemented by a dedicated processing chip, a processing circuit, a processor, or a general-purpose chip.

As another implementation, it may be considered that a general-purpose computer is used to implement the lawn mower control device provided in the embodiments of the present application. That is, program codes for implementing the functions of the processor 301 and the transceiver 303 are stored in the memory 302, and a general-purpose processor implements the functions of the processor 301 and the transceiver 303 by executing the codes in the memory 302.

For the concept, explanation, detailed description and other steps related to the technical solutions provided in the embodiments of the present application, to which the device relates, reference is made to the description of the contents of the method steps performed by the device in the above method or other embodiments, which will not be described again here.

The embodiments of the present application further provide a lawn mower comprising a memory storing a computer program and a processor which, when executing the computer program, implements the method of the above method embodiments.

The embodiments of the present application further provide a computer-readable storage medium having stored thereon a computer program which, when executed by a processor, implements the method of the above method embodiments.

The embodiments of the present application further provide a computer program product comprising a computer program which, when executed by a processor, implements the method of the above method embodiments.

A person of ordinary skill in the art can understand that all or part of the flows in the methods in the above embodiments can be implemented by a computer program by instructing related hardware. The computer program can be stored in a non-volatile computer readable storage medium, and when the computer program is executed, the flows such as the embodiments of the above various methods may be comprised. Any reference to the memory, storage, the database or other media used in the embodiments provided in the present application may include at least one of non-volatile and volatile memories. The non-volatile memory may include a read-only memory (ROM), a magnetic tape, a floppy disk, a flash memory, an optical memory, etc. The volatile memory may include a random access memory (RAM), or an external cache memory. As an illustration and not a limitation, RAM may be in various forms, such as a static random access memory (SRAM) or a dynamic random access memory (DRAM).

The technical features of the above embodiments may be combined arbitrarily. For the purpose of simplicity in description, all the possible combinations of the technical features in the above-described embodiments are not described. However, as long as there is no contradiction among the combinations of these technical features, they shall all fall within the scope of the description.

The above embodiments merely represent several implementations of the present application, giving specifics and details thereof, but should not be understood as limiting the scope of the present patent of invention thereby. It should be noted that a person of ordinary skill in the art could also make several alterations and improvements without departing from the spirit of the present application and these would all fall within the scope of protection of the present application. Therefore, the scope of protection of the present patent application shall be in accordance with the appended claims.

The invention claimed is:

1. A lawn mower control method, comprising:
    detecting operating data and sensing data of a plurality of operating sensors provided on a lawn mower, wherein the plurality of operating sensors comprise at least two different types of sensors, the at least two different types of sensors comprise image sensors and position sensors, sensing data of the at least two different types of sensors is configured to obtain an information of obstacle;
    fusing the sensing data of the plurality of operating sensors to obtain environment data around the lawn mower, the environment data comprises the information of obstacle;
    determining, when it is detected that a fault occurs in any of the operating sensors, a fault type of a faulty sensor according to the operating data of the faulty sensor the environment data around the lawn mower, and a correspondence table corresponding to the faulty sensor, wherein the faulty sensor is an operating sensor in which a fault occurs, the correspondence table comprises a correspondence of various fault types with a range of parameters, the range of parameters comprising a range of operating data and a range of environment data; and
    controlling, in response to the fault type of the faulty sensor is a first fault type, the faulty sensor to stop operating, and a backup sensor corresponding to the faulty sensor to start operating.

2. The method according to claim 1, wherein
the correspondence table is a preset correspondence table or a correspondence table obtained from a server based on historical fault data.

3. The method according to claim 2, before controlling a backup sensor corresponding to the faulty sensor to start operating, further comprising:
determining the backup sensor corresponding to the faulty sensor;
the step of determining the backup sensor corresponding to the faulty sensor comprising:
determining an identification of the faulty sensor;
determining an identification associated with the identification of the faulty sensor according to the identification of the faulty sensor and a preset association relationship, wherein the preset association relationship comprises an association relationship between an identification of each operating sensor and an identification of a respective backup sensor; and
determining the backup sensor indicated by the identification associated with the identification of the faulty sensor as the backup sensor corresponding to the faulty sensor.

4. The method according to claim 1, wherein the step of determining the fault type of the faulty sensor according to the operating data of the faulty sensor, the environment data around the lawn mower, and a correspondence table corresponding to the faulty sensor comprises:
determining, in response to the operating data of the faulty sensor and the environment data around the lawn mower satisfy a range of parameters corresponding to the first fault type characterizing a hardware fault, that the fault type of the faulty sensor is the first fault type; and
determining, in response to the operating data of the faulty sensor and the environment data around the lawn mower satisfy a range of parameters corresponding to a second fault type characterizing a software fault, that the fault type of the faulty sensor is the second fault type.

5. The method according to claim 4, further comprising:
controlling the faulty sensor to restart in response to the fault type of the faulty sensor is the second fault type.

6. The method according to claim 5, after controlling the faulty sensor to restart, further comprising:
controlling, in response to it is detected that a fault still occurs in the faulty sensor after restarting, the faulty sensor to stop operating, and the backup sensor corresponding to the faulty sensor to start operating.

7. The method according to claim 4, before controlling a backup sensor corresponding to the faulty sensor to start operating, further comprising:
determining the backup sensor corresponding to the faulty sensor;
the step of determining the backup sensor corresponding to the faulty sensor comprising:
determining an identification of the faulty sensor;
determining an identification associated with the identification of the faulty sensor according to the identification of the faulty sensor and a preset association relationship, wherein the preset association relationship comprises an association relationship between an identification of each operating sensor and an identification of a respective backup sensor; and
determining the identification of the respective backup sensor indicated by the identification associated with the identification of the faulty sensor as the backup sensor corresponding to the faulty sensor.

8. The method according to claim 1, wherein
using a trained fault recognition model to perform fault recognition based on the operating data of the faulty sensor and the environment data around the lawn mower, so as to obtain the fault type of the faulty sensor; wherein a training method for the trained fault recognition model comprises:
obtaining a training data, the training data comprising operating data and environment data, and a true fault type of a sample faulty sensor when a fault occurs in the sample faulty sensor, wherein the true fault type of the sample faulty sensor comprises the first fault type characterizing a hardware fault and a second fault type characterizing a software fault; and
using the training data to train a fault recognition model to be trained, so as to obtain the trained fault recognition model.

9. The method according to claim 8, before controlling a backup sensor corresponding to the faulty sensor to start operating, further comprising:
determining the backup sensor corresponding to the faulty sensor;
the step of determining the backup sensor corresponding to the faulty sensor comprising:
determining an identification of the faulty sensor;
determining an identification associated with the identification of the faulty sensor according to the identification of the faulty sensor and a preset association relationship, wherein the preset association relationship comprises an association relationship between an identification of each operating sensor and an identification of a respective backup sensor; and
determining the identification of the respective backup sensor indicated by the identification associated with the identification of the faulty sensor as the backup sensor corresponding to the faulty sensor.

10. The method according to claim 8, further comprising:
controlling the faulty sensor to restart in response to the fault type of the faulty sensor is the second fault type.

11. The method according to claim 1, before controlling a backup sensor corresponding to the faulty sensor to start operating, further comprising:
determining the backup sensor corresponding to the faulty sensor;
the step of determining the backup sensor corresponding to the faulty sensor comprising:
determining an identification of the faulty sensor;
determining an identification associated with the identification of the faulty sensor according to the identification of the faulty sensor and a preset association relationship, wherein the preset association relationship comprises an association relationship between an identification of each operating sensor and an identification of a respective backup sensor; and
determining the identification of the respective backup sensor indicated by the identification associated with the identification of the faulty sensor as the backup sensor corresponding to the faulty sensor.

12. A lawn mower, comprising a memory storing a computer program, and a processor, wherein the processor, when executing the computer program, implements a method of claim 1.

13. The lawn mower according to claim 12, wherein the correspondence table is a preset correspondence table or a correspondence table obtained from a server based on historical fault data.

14. The lawn mower according to claim 12, wherein the step of determining the fault type of the faulty sensor according to the operating data of the faulty sensor, the environment data around the lawn mower, and a correspondence table corresponding to the faulty sensor comprises:
   determining, in response to the operating data of the faulty sensor and the environment data around the lawn mower satisfy a range of parameters corresponding to the first fault type characterizing a hardware fault, that the fault type of the faulty sensor is the first fault type; and
   determining, in response to the operating data of the faulty sensor and the environment data around the lawn mower satisfy a range of parameters corresponding to a second fault type characterizing a software fault, that the fault type of the faulty sensor is the second fault type.

15. The lawn mower according to claim 14, further comprising:
   controlling the faulty sensor to restart in response to the fault type of the faulty sensor is the second fault type.

16. The lawn mower according to claim 12, wherein comprises:
   using a trained fault recognition model to perform fault recognition based on the operating data of the faulty sensor and the environment data around the lawn mower, so as to obtain the fault type of the faulty sensor; wherein a training method for the trained fault recognition model comprises:
   obtaining training data, the training data comprising operating data and environment data, and a true fault type of the sample faulty sensor when a fault occurs in a sample faulty sensor, wherein the true fault type comprises the first fault type characterizing a hardware fault and a second fault type characterizing a software fault; and
   using the training data to train a fault recognition model to be trained, so as to obtain the trained fault recognition model.

17. The lawn mower according to claim 16, further comprising:
   controlling the faulty sensor to restart in response to the fault type of the faulty sensor is the second fault type.

18. The lawn mower according to claim 12, before controlling a backup sensor corresponding to the faulty sensor to start operating, further comprising:
   determining the backup sensor corresponding to the faulty sensor;
   the step of determining the backup sensor corresponding to the faulty sensor comprising:
   determining an identification of the faulty sensor;
   determining an identification associated with the identification of the faulty sensor according to the identification of the faulty sensor and a preset association relationship, wherein the preset association relationship comprises an association relationship between an identification of each operating sensor and an identification of a respective backup sensor; and
   determining the identification of the respective backup sensor indicated by the identification associated with the identification of the faulty sensor as the backup sensor corresponding to the faulty sensor.

19. A computer-readable storage medium having stored thereon a computer program, wherein the computer program, when executed by a processor, implements a method of claim 1.

20. A lawn mower control device, comprising:
   a detection unit configured to detect operating data and sensing data of a plurality of operating sensors provided on a lawn mower, wherein the plurality of operating sensors comprise at least two different types of sensors, the at least two different types of sensors comprise image sensors and position sensors, sensing data of the at least two different types of sensors is configured to obtain an information of obstacle;
   a fusion unit configured to fuse the sensing data of the plurality of operating sensors to obtain environment data around the lawn mower, the environment data comprises information of the obstacle;
   a determination unit configured to determine, when it is detected that a fault occurs in any of the operating sensors, a fault type of a faulty sensor according to the operating data of the faulty sensor, the environment data around the lawn mower, and a correspondence table corresponding to the faulty sensor, wherein the faulty sensor is an operating sensor in which a fault occurs, the correspondence table comprises a correspondence of various fault types with a range of parameters, the range of parameters comprising a range of operating data and a range of environment data; and
   a control unit configured to control, in response to the fault type of the faulty sensor is a first fault type, the faulty sensor to stop operating, and a backup sensor corresponding to the faulty sensor to start operating.

* * * * *